US006993190B1

(12) United States Patent
Nguyen (10) Patent No.: US 6,993,190 B1
(45) Date of Patent: Jan. 31, 2006

(54) SYSTEM AND METHOD FOR DETECTING TEXT EDGES IN DIGITAL DOCUMENT IMAGES

(75) Inventor: Truong-Thao Nguyen, Fort Lee, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 918 days.

(21) Appl. No.: 09/704,359

(22) Filed: Nov. 1, 2000

(51) Int. Cl.
*G06K 9/48* (2006.01)
*G06K 9/40* (2006.01)

(52) U.S. Cl. ............... 382/199; 382/266; 358/519; 358/520; 358/521

(58) Field of Classification Search ............ 382/282, 382/199, 283, 287, 290, 292, 260–266; 358/3.15, 358/519–521, 534
See application file for complete search history.

(56) References Cited

U.S. PATENT DOCUMENTS

| | | | | |
|---|---|---|---|---|
| 5,252,985 | A * | 10/1993 | Christinsin ............... | 343/880 |
| 5,392,365 | A | 2/1995 | Steinkirchner | |
| 5,768,438 | A * | 6/1998 | Etoh ............... | 382/251 |
| 5,822,469 | A * | 10/1998 | Silverstein ............... | 382/267 |
| 5,825,937 | A | 10/1998 | Ohuchi et al. ............... | 382/261 |
| 5,852,475 | A * | 12/1998 | Gupta et al. ............... | 348/606 |
| 5,870,495 | A * | 2/1999 | Mancuso et al. ............ | 382/199 |
| 5,920,356 | A * | 7/1999 | Gupta et al. ............... | 348/606 |
| 5,946,420 | A * | 8/1999 | Noh ............... | 382/254 |
| 6,408,109 | B1 * | 6/2002 | Silver et al. ............... | 382/300 |
| 6,535,221 | B1 * | 3/2003 | Allen et al. ............... | 345/611 |
| 6,608,942 | B1 * | 8/2003 | Le ............... | 382/279 |
| 6,636,635 | B2 * | 10/2003 | Matsugu ............... | 382/218 |

FOREIGN PATENT DOCUMENTS

| | | |
|---|---|---|
| EP | 389968 B1 | 7/1996 |
| EP | 0723364 B1 | 4/2000 |

OTHER PUBLICATIONS

Mokhtarian et al., "Robust image corner detection through curvature scale space"; Pattern Analysis and Machine Intelligence, I.E.E.E. vol. 20, pp. 1376-1381; Dec. 1998.☐☐.*
Strickland, "Tumor detection in nonstationary backgrounds"; Medical Image, I.E.E.E. vol. 13, pp. 491-499; Sep. 1994.*
Verbeek et al., "On the locatin error of curved edges in Low-Pass Filtered 2-D and 3-D Images"; Pattern Analysis and Machine Intelligence, I.E.E.E. vol. 16, pp. 726-733; Jul. 1994.*
Wuescher et al., "Robust contour decomposition using a constant curvature criterion"; Pattern Analysis and Machine Intelligence, I.E.E.E. vol. 13, pp. 41-51; Jan. 1991.*
El-Fallah et al., "The evolution of mean curvature in image filtering"; Image Process, I.E.E.E. vol. 1, pp. 298-302; Nov. 1994.*
John T. Favata et al., entitled "A Multiple Feature/Resolution Approach to Handprinted Digit and Character Recognition", International Journal of Imaging Systems and Technology, Wiley and Sons, New York, USA, pp. 304-311.

(Continued)

*Primary Examiner*—Samir Ahmed
*Assistant Examiner*—Brian Le (57) ABSTRACT

A system and method for detecting text edges in digital document images utilizes filters that process the luminance and/or chrominance values within a selected region of the image to determine whether a given pixel of the selected image region is a text edge. The filters are configured to determine the gradient, the curvature, the maximum luminance value, and/or the maximum chrominance value for the luminance values within the selected region of the document image. Two or more of these indicators are used to detect text edges in the document image.

17 Claims, 9 Drawing Sheets

OTHER PUBLICATIONS

V. Wu, et al., entitled "Document Image Clean-Up and Binarization", Document Recognition V, San Jose, CA, USA, Jan. 28-29, 1998, vol. 3305, pp. 263-273, XP-001091409 proceedings of the SPIE—The International Society for Optical Engineering, 1998, SPIE-Int. Soc. Opt. Eng, USA, ISSN: 0277-786X, 1 page abstract enclosed.

* cited by examiner

SYSTEM AND METHOD FOR DETECTING TEXT EDGES IN DIGITAL DOCUMENT IMAGES

FIELD OF THE INVENTION

The invention relates generally to the field of image processing, and more particularly to a system and method for detecting text edges in document images for use in digital copiers.

BACKGROUND OF THE INVENTION

Analog copiers use lenses and mirrors to optically transfer an image of an original onto an electrostatically-charged photoconductive drum. The optically transferred image creates electronically charged regions on the drum that define a negative of the original on the drum. The charged drum is then exposed to toner particles that are of the opposite charge with respect to the drum, causing the toner particles to bond with the charged regions of the drum. The toner particles on the drum are then transferred and fused to a piece of paper, which produces a copy of the original image on the paper.

One of the disadvantages of analog copiers is that the original image must be reflected onto the drum to produce a single copy of the original. Thus, if multiples copies are needed, the original image must be repeatedly reflected onto the drum to print the copies. In addition, analog copiers require a physical original to create copies. That is, an electronic document or image cannot be reproduced using an analog copier, unless a hard copy of the document or image exists. Furthermore, due to the use of lenses and mirrors, analog copiers are generally limited in their image manipulation functionalities to reduction and enlargement.

In contrast, digital copiers use a scanner, instead of lenses and mirrors, to capture an image of the original. Typically, a charged coupled device (CCD) is used to digitally capture the image of the original. The captured image is stored in memory as an electronic or digital image. The digital image can then be printed using laser printing technology, or can be manipulated using digital image processing. Alternatively, the digital image can be transmitted to a desired destination via a network, such as the Internet, where the image can be printed or digitally manipulated. Since digital images are used to produce copies, digital copiers do not suffer from the previously described disadvantages of the analog copiers.

Using the stored digital image of an original, digital copiers can produce multiple copies of the original without having to repeatedly scan the original. In addition, digital copiers do not require a physical original to produce copies. An electronic version of the original may be used to make copies of the original. Furthermore, digital copiers can have a wide range of image manipulation functionalities. For example, in addition to reduction and enlargement, digital copiers can perform text enhancements, such as text edge sharpening and text edge darkening, when making copies of documents.

In order to effectively perform text enhancements, digital copiers need to properly detect the text edges in a given document image. However, there are a number of difficulties in detecting text edges in images. For example, if the document image includes small font text, the edges of the text may be missed during the edge detection process. In addition, if the document image contains pictorial content, the pictorial features of the document image may be mistaken for text edges. Furthermore, halftones in the image may also cause false text edge detection. These edge detection errors can significantly affect the quality of the document copies produced by digital copiers.

In view of these difficulties, there is a need for a system and method to more effectively detect the edges of text contained in document images so that text enhancements can be performed on the images.

SUMMARY OF THE INVENTION

A system and method for detecting text edges in digital document images utilizes filters that process the luminance and/or chrominance values within a selected region of the image to determine whether a given pixel of the selected image region is a text edge pixel. The filters are configured to determine the gradient, the curvature, the maximum luminance value, and/or the maximum chrominance value for the luminance values within the selected image region. The use of these filters reduces the likelihood of text edge misdetection due to small font text, as well as the likelihood of erroneous text edge detection due to pictorial features and/or halftones of the document image.

A system in accordance with the present invention includes at least two filters that are configured to compute two luminance characteristics of a selected region of an input digital image. The luminance characteristics relate to pixel-to-pixel variations of luminance values within the selected region. In one embodiment, the two filters are configured to compute the two-dimensional gradient value and the two-dimensional curvature value for the luminance values within the selected region of the input digital image. The system further includes circuitry that is configured to determine whether either one of the two luminance characteristics exceeds a predefined threshold, which is indicative of the presence of a text edge in the selected image region.

In other embodiments, the system includes an additional filter that is configured to compute the maximum luminance value or the maximum chrominance value within the image region. These maximum values are used as additional indicators to determine whether the current image region includes a text edge.

A method in accordance with the present invention includes the steps of computing a first luminance characteristic of a selected region of an input digital image and computing a second luminance characteristic of the selected image region. In one embodiment, these steps include computing the two-dimensional gradient value and the two-dimensional curvature value for the luminance values within the selected image region. The method further includes a step of determining whether either one of the two luminance characteristics exceeds a predefined threshold, which is indicative of the presence of a text edge in the selected image region.

In other embodiments, the method may further include a step of determining whether the maximum luminance value of the selected image region exceeds a predefined luminance value or a step of determining whether the maximum chrominance value of the selected image region exceeds a predefined chrominance value. These maximum values are used as additional indicators to determine whether the current image region includes a text edge.

In an alternative embodiment, the method includes a step of computing a luminance characteristic of a selected region of an input digital image and a step of extracting the maximum luminance value of the selected image region. In one embodiment, the step of computing the luminance characteristic includes computing a two-dimensional luminance gradient value of the selected image region. In another embodiment, the step of computing the luminance characteristic includes computing a two-dimensional luminance curvature value of the selected image region. The method further includes a step of comparing the luminance characteristic and the maximum luminance value to corresponding thresholds to determine whether the selected image region includes a text edge.

Other aspects and advantages of the present invention will become apparent from the following detailed description, taken in conjunction with the accompanying drawings, illustrated by way of example of the principles of the invention.

DETAILED DESCRIPTION

Figure 1:
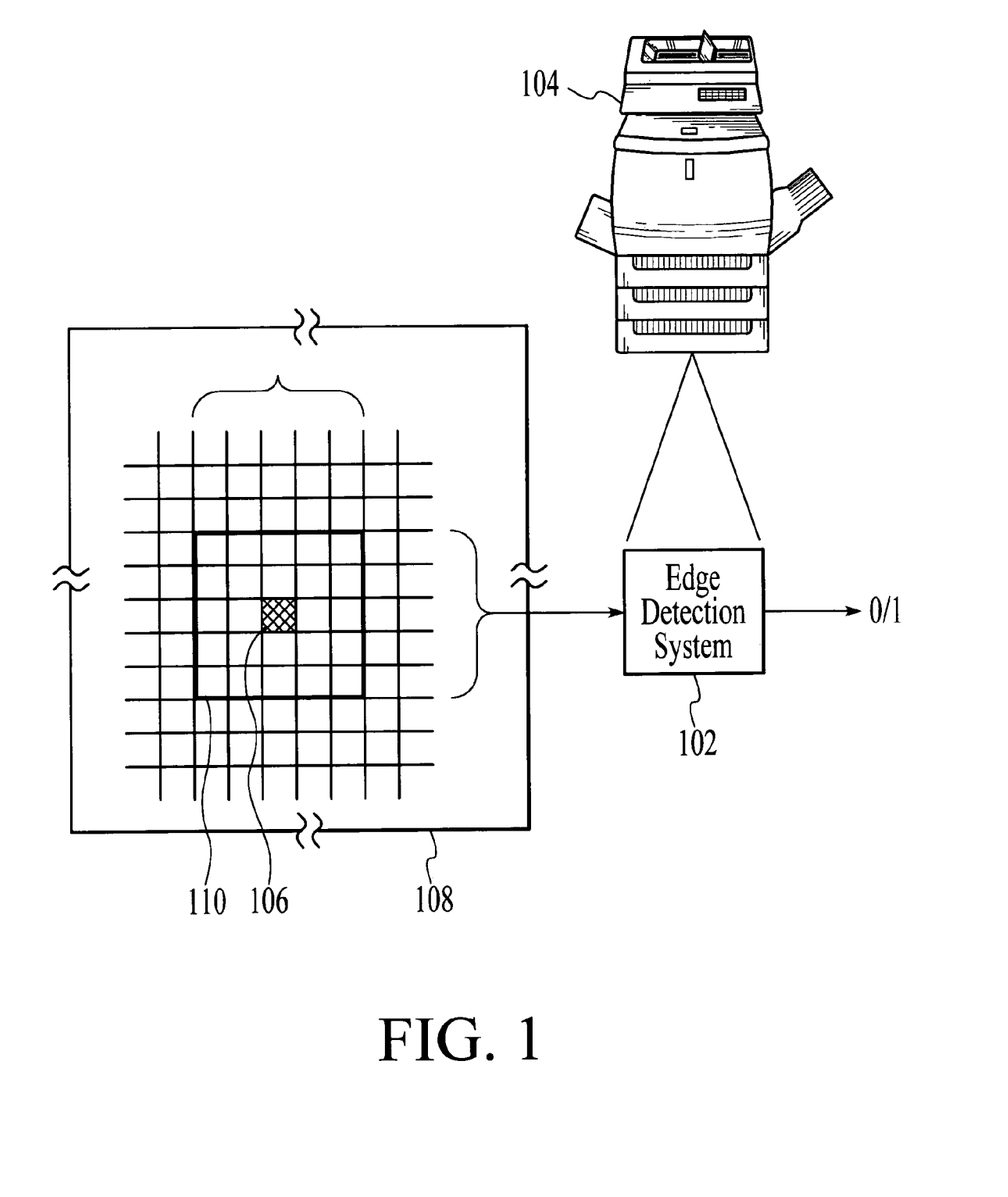
FIG. 1 is an illustration of an edge detection system in accordance with the present invention.

With reference to FIG. 1, an edge detection system 102 in accordance with the present invention is shown. The edge detection system is designed to detect text edges in a document image by determining whether a given pixel is part of an edge of text contained in the image. The edge detection system may be implemented in an ASIC for real-time application in a digital copier 104. The system is particularly effective for document images having black text on white background, although the system is not limited to such images.

For a current pixel 106 of interest in a given document image 108, the edge detection system 102 operates to read the luminance and chrominance values of the pixels within a square or a rectangular window 110 of predefined size, called "the window of observation". As shown in FIG. 1, the observation window 110 may be a 5×5 pixel window with the pixel 106 of interest in the center of the window. The luminance and chrominance values of the pixels within the observation widow are then processed to determine whether the current pixel 106 of the image is a text edge pixel. If the current pixel is not a text edge pixel, the edge detection system outputs a "0". However, if the current pixel is a text edge pixel, the system outputs a "1". For the subsequent pixel, the observation window is shifted such that the next pixel of interest is at the center of the observation window. The luminance and chrominance values of the pixels within the window are then processed to determine whether this pixel of interest is a text edge pixel. This procedure is repeated until the entire image has been processed.

Figure 2:
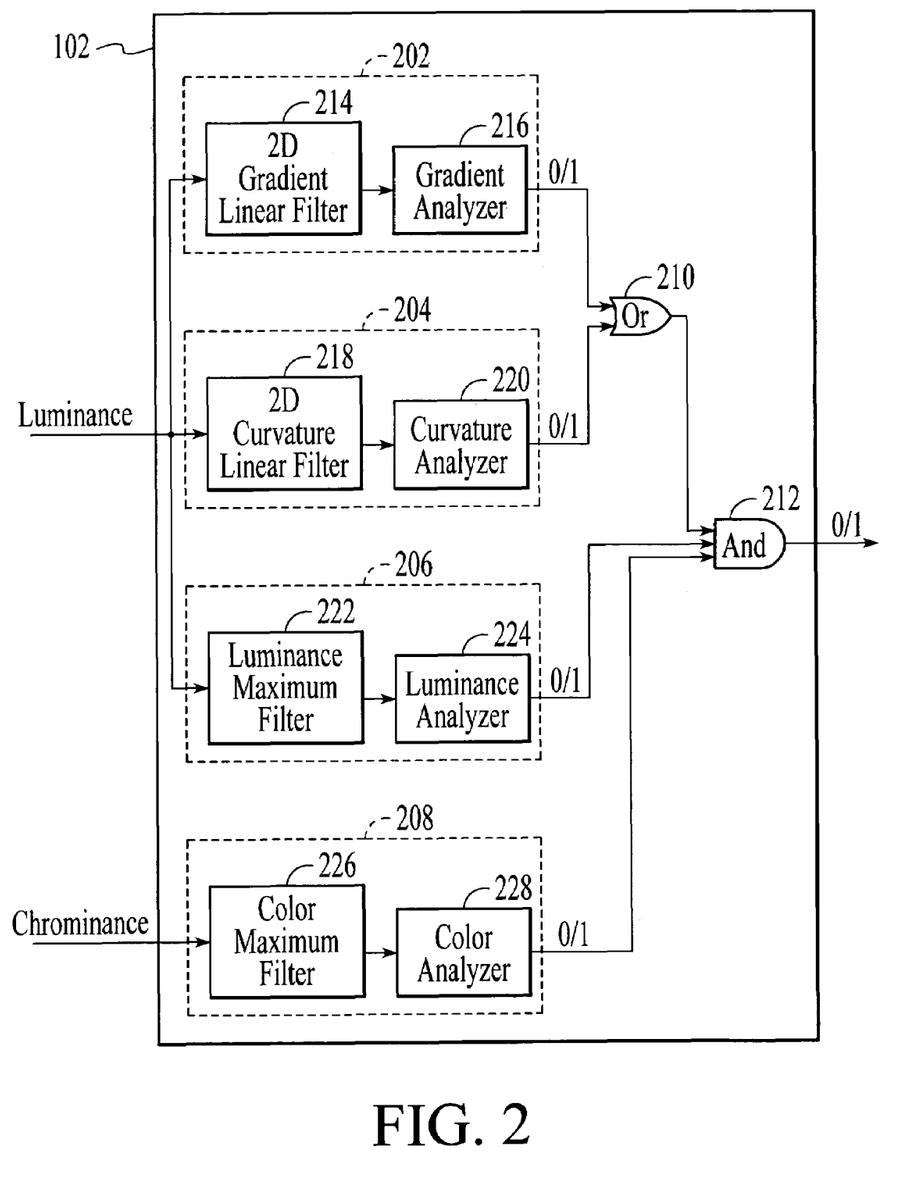
FIG. 2 is a block diagram of the components of the edge detection system.

As shown in FIG. 2, the edge detection system 102 includes a gradient detector 202, a curvature detector 204, a neighborhood luminance detector 206, and a neighborhood color detector 208. The system also includes an OR circuit 210 and an AND circuit 212. The OR circuit is coupled to the outputs of the gradient and curvature detectors, while the AND circuit is coupled to the outputs of the OR circuit, the luminance detector and the color detector.

Figure 3:
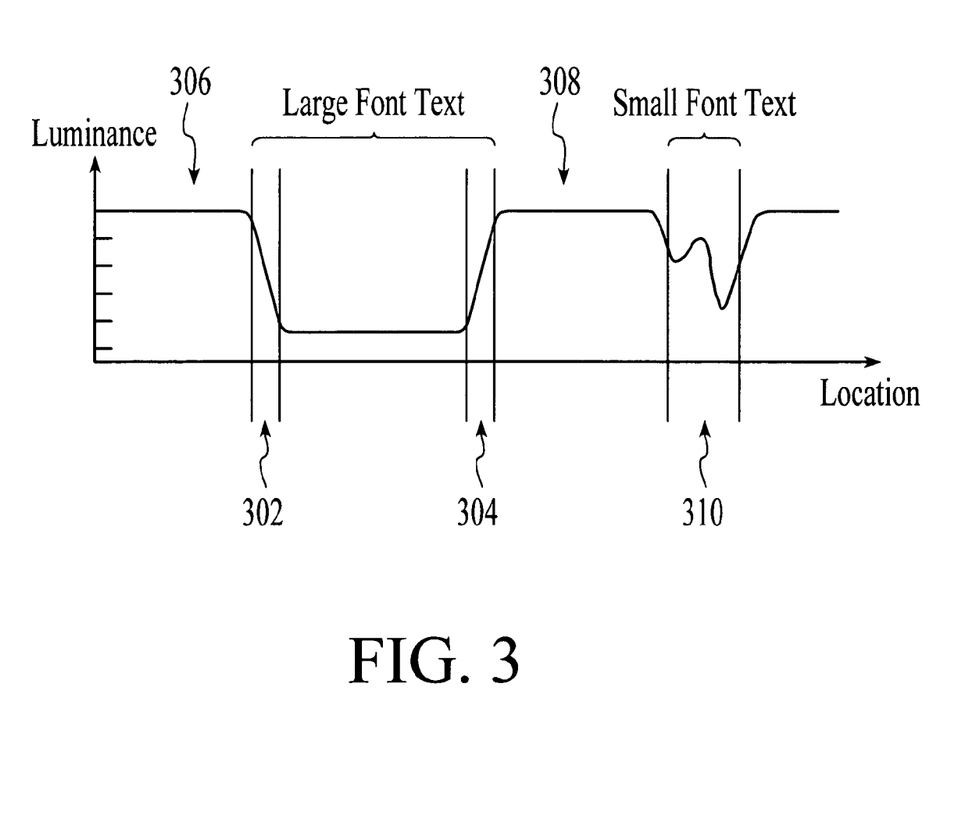
FIG. 3 is a graph that illustrates areas of high luminance gradient and high luminance curvature for large and small font text.

The gradient detector 202 of the edge detection system 102 operates to determine whether the current pixel of an image is located in an area of high luminance gradient, which indicates that the pixel may be an edge pixel. FIG. 3 is a one-dimensional plot of luminance values versus location on a document image. As illustrated in FIG. 3, the edges 302 and 304 of a large font text are characterized by high luminance gradient. By detecting these regions of high luminance gradient, the gradient detector is able to identify potential text edge pixels.

The gradient detector 202 includes a two-dimensional gradient filter 214 and a gradient analyzer 216 that are coupled in series, as shown in FIG. 2. The gradient filter operates to output a luminance gradient value for the pixels within the current window of observation. The output of the gradient filter is a large, positive value when the local gradient about the current pixel of interest is large, such as the regions 302 and 304 of FIG. 3.

Conversely, the output of the gradient filter is a small value (e.g., zero) when the local gradient about the current pixel is relatively flat, such as the regions 306 and 308 of FIG. 3.

Figure 4:
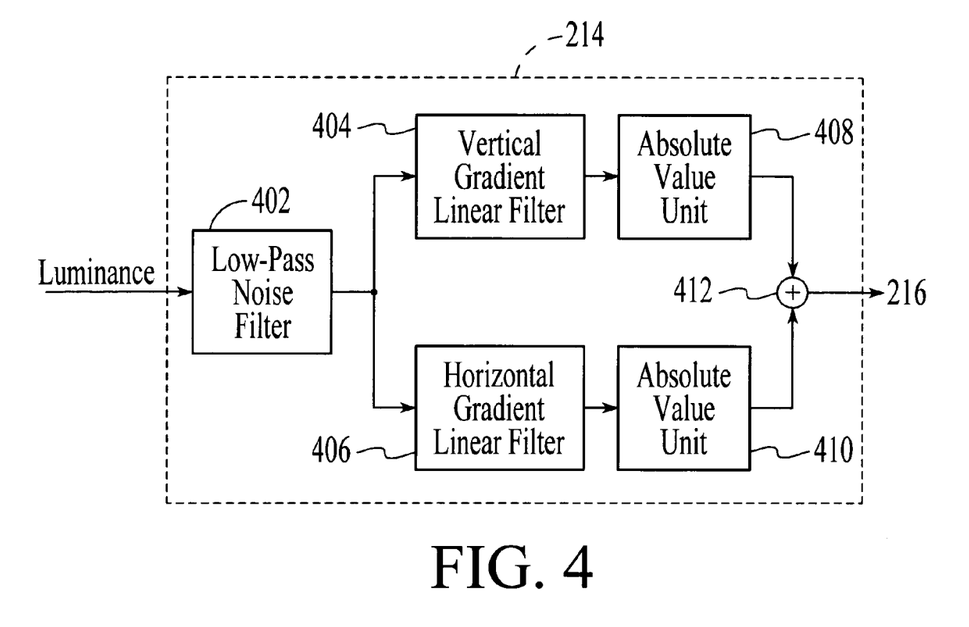
FIG. 4 is a block diagram of the components of a two-dimensional gradient linear filter included in the edge detection system.

The components of the gradient filter 214 are shown in FIG. 4. The gradient filter includes an optional low-pass noise filter 402, a vertical gradient linear filter 404, a horizontal gradient linear filter 406, absolute value units 408 and 410, and a summing unit 412. The low-pass noise filter is first applied to the input, i.e., the luminance values of the pixels within the current window of observation, to avoid detecting gradient due to noise or halftone features. An example of a noise filter mask that can be utilized by the low-pass noise filter is shown below.

$$\begin{bmatrix} 1 & 2 & 1 \\ 2 & 4 & 2 \\ 1 & 2 & 1 \end{bmatrix}$$

The vertical gradient linear filter 404 operates to compute a raw vertical gradient value for the luminance values of pixels within the window of observation using a vertical gradient mask, while the horizontal gradient linear filter 406 operates to compute a raw horizontal gradient value for the same luminance values using a horizontal gradient mask. The most elementary masks that can be used by the vertical and horizontal gradient linear filters are shown below.

$$\begin{bmatrix} -1 \\ 0 \\ 1 \end{bmatrix}$$

vertical gradient mask $$[-1 \quad 0 \quad 1]$$

horizontal gradient mask

However, for implementation regularity, masks having the same square size may be preferred. One way to derive these square-sized masks is to combine each of the above masks with a one-dimensional low-pass filtering of the same length but in the perpendicular direction. For example, if [1 2 1] is selected to be the mask of the perpendicular filter, the two resulting gradient masks of the vertical and horizontal gradient linear filters 404 and 406 are as follows:

$$\begin{bmatrix} -1 & -2 & -1 \\ 0 & 0 & 0 \\ 1 & 2 & 1 \end{bmatrix}$$

3x3 vertical gradient mask $$\begin{bmatrix} -1 & 0 & 1 \\ -2 & 0 & 2 \\ -1 & 0 & 1 \end{bmatrix}$$

3x3 horizontal gradient mask

In an alternative embodiment, the noise filtering of the low-pass noise filter 402 can be performed by the two gradient linear filters 404 and 406. In this embodiment, the vertical and horizontal gradient masks that are used by the gradient linear filters can be derived by merging the 3x3 noise filter mask with the 3x3 gradient masks. The resulting masks are as follows:

$$\begin{bmatrix} -1. & -4 & -6 & -4 & -1 \\ -2 & -8 & -12 & -8 & -2 \\ 0 & 0 & 0 & 0 & 0 \\ 2 & 8 & 12 & 8 & 2 \\ 1 & 4 & 6 & 4 & 1 \end{bmatrix}$$

vertical gradient mask $$\begin{bmatrix} -1 & -2 & 0 & 2 & 1 \\ -4 & -8 & 0 & 8 & 4 \\ -6 & -12 & 0 & 12 & 6 \\ -4 & -8 & 0 & 8 & 4 \\ -1 & -2 & 0 & 2 & 1 \end{bmatrix}$$

horizontal gradient mask

The absolute value units 408 and 410 of the gradient linear filter 214 operate to convert the outputs from the vertical and horizontal gradient linear filters 404 and 406, respectively, to positive values. The summing unit 412 then combines the outputs from the two absolute value units to generate a summed gradient value. The final output of the two-dimensional gradient linear filter 214 is transmitted to the gradient analyzer 216.

Figure 5:
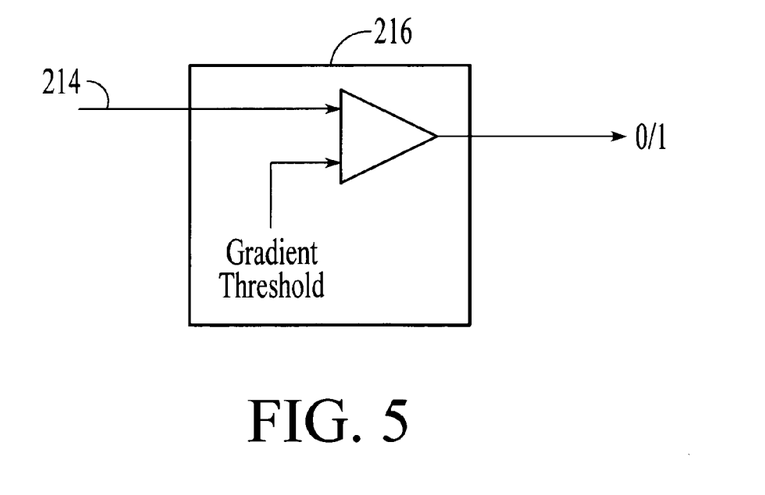
FIG. 5 is an illustration of a gradient analyzer of the edge detection system.

The gradient analyzer 216 of the gradient detector 202 operates to compare the final gradient filter output to a predefined gradient threshold, as shown in FIG. 5. The gradient analyzer generates a binary signal to indicate the result of the comparison. If the final gradient filter output is greater than the gradient threshold, the gradient analyzer generates a "1". However, if the final gradient filter output is not greater than the gradient threshold, the gradient analyzer generates a "0".

Turning back to FIG. 2, the curvature detector 204 of the edge detection system 102 operates to determine whether the current pixel of an image is located in an area of high curvature. As shown in FIG. 3, the edges of a small font text may not have enough gradient to be detected by the gradient detector 202. However, the small font text is characterized by high curvature, as illustrate by the region 310 of FIG. 3. Thus, the curvature detector is able to detect text edge pixels that may potentially be missed by the gradient detector.

The curvature detector 204 includes a two-dimensional curvature linear filter 218 and a curvature analyzer 220 that are coupled in series, as shown in FIG. 2. The curvature filter operates in a similar manner to the two-dimensional gradient linear filter 214 of the gradient detector 202.

The curvature filter 218 reads the luminance values for the pixels within the window of observation and then outputs a curvature value. The output of the curvature filter is a large, positive value when the local curvature about the current pixel of interest is significant, such as the region 310 of FIG. 3. Conversely, the output of the curvature filter is a small value when the area around the current pixel has low luminance curvature. The output of the curvature filter is then compared to a predefined curvature threshold by the curvature analyzer 220. If the curvature filter output is greater than the curvature threshold, the output of the curvature analyzer is a "1". However, if the curvature filter output is not greater than the curvature threshold, the output of the gradient analyzer is a "0".

Figure 6:
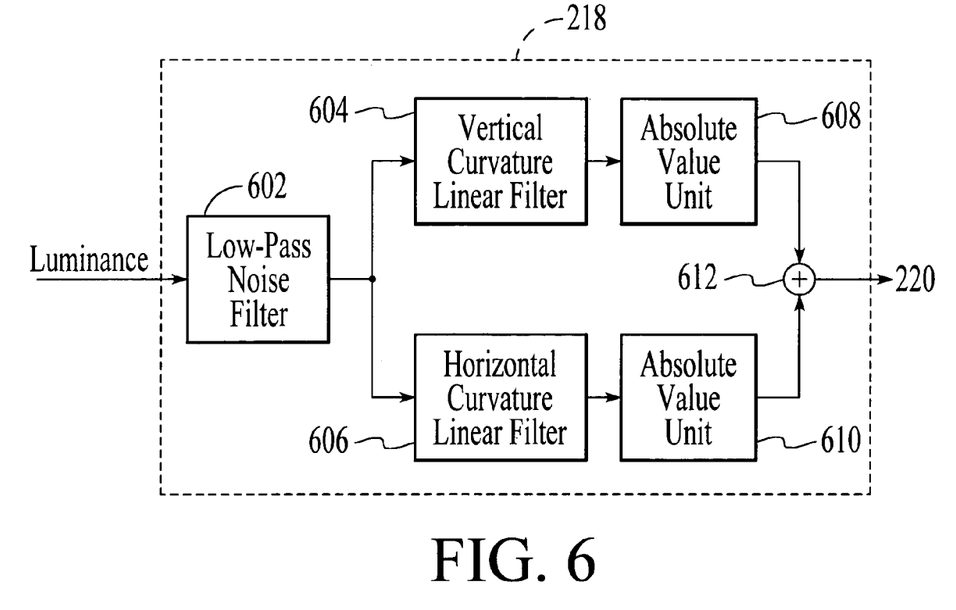
FIG. 6 is a block diagram of the components of a two-dimensional curvature filter included in the edge detection system.
Figure 7:
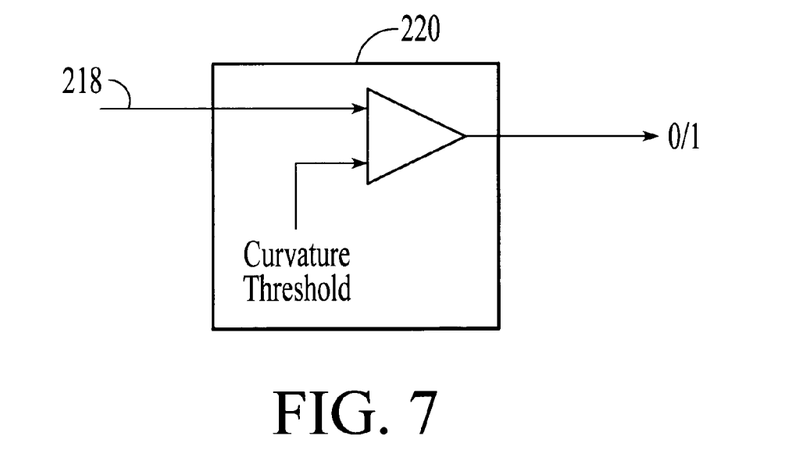
FIG. 7 is an illustration of a curvature analyzer of the edge detection system.

As shown in FIG. 6, the curvature filter 218 includes an optional low-pass noise filter 602, a vertical curvature linear filter 604, a horizontal curvature linear filter 606, absolute value units 608 and 610, and a summing unit 612. The components of the curvature filter 218 operate in the same manner as the components 402–412 of the gradient filter 214. The low-pass noise filter 602 is first applied to the input, i.e., the luminance values of the pixels within the current window of observation, to avoid detecting curvature due to noise or halftone features. The noise filter mask of the low-pass noise filter 602 may be identical to the mask of the low-pass noise filter 402 of the gradient filter 214. The vertical and horizontal curvature filters 604 and 606 operate to generate raw vertical and horizontal curvature values for the luminance values within the current window of observation using two masks. The absolute value units 608 and 610 operate to convert the outputs from the vertical and horizontal curvature linear filters to positive values. The summing unit 612 then combines the outputs from the two absolute value units and generates a final summed curvature value. The final curvature value is transmitted from the curvature filter 218 to the curvature analyzer 220.

The substantive difference between the curvature filter components 602–612 and the gradient filter components 402–412 is the masks that are used by the vertical and horizontal curvature linear filters 604 and 606 to compute the raw vertical and horizontal curvature values. The elementary masks that can be used by the vertical and horizontal curvature linear filters are as follows:

$$\begin{bmatrix} -1 \\ 2 \\ -1 \end{bmatrix}$$

vertical curvature mask $$[-1 \quad 2 \quad -1]$$

horizontal curvature mask

The 3×3 curvature masks with low-pass filtering that can be used by the vertical and horizontal curvature linear filters are as follows:

$$\begin{bmatrix} -1 & -2 & -1 \\ 2 & 4 & 2 \\ -1 & -2 & -1 \end{bmatrix}$$

3x3 vertical curvature mask $$\begin{bmatrix} -1 & 2 & -1 \\ -2 & 4 & -2 \\ -1 & 2 & -1 \end{bmatrix}$$

3x3 horizontal curvature mask

Lastly, the curvature masks derived by merging the noise filter mask with the 3×3 curvature masks that can be used by the vertical and horizontal curvature linear filters 604 and 606 are as follows:

$$\begin{bmatrix} -1 & -4 & -6 & -4 & -1 \\ 0 & 0 & 0 & 0 & 0 \\ 2 & 8 & 12 & 8 & 2 \\ 0 & 0 & 0 & 0 & 0 \\ -1 & -4 & -6 & -4 & -1 \end{bmatrix}$$

vertical curvature mask $$\begin{bmatrix} -1 & 0 & 2 & 0 & -1 \\ -4 & 0 & 8 & 0 & -4 \\ -6 & 0 & 12 & 0 & -6 \\ -4 & 0 & 8 & 0 & -4 \\ -1 & 0 & 2 & 0 & -1 \end{bmatrix}$$

horizontal curvature mask

Note that if the noise filters 402 and 602 are not merged with the vertical and horizontal gradient linear filters 404 and 406 and the vertical and horizontal curvature linear filters 604 and 606, only a single common low-pass noise filter is needed. In such an embodiment, one of the low-pass noise filters 402 and 602 can operate for both the gradient and curvature detectors 202 and 204.

Turning back to FIG. 2, the luminance detector 206 of the edge detection system 102 operates to determine if there is a pixel luminance value within the window of observation that can be attributable to background luminance. For a pixel to belong to a text edge, a necessary condition is that there must exist one or more pixels in the neighborhood having luminance values substantially equivalent to the background luminance. That is, if the current pixel is a text edge pixel, there should be background pixels in the vicinity. The luminance detector uses this fact to eliminate pixels as text edge pixels when this condition is not satisfied.

Figure 8:
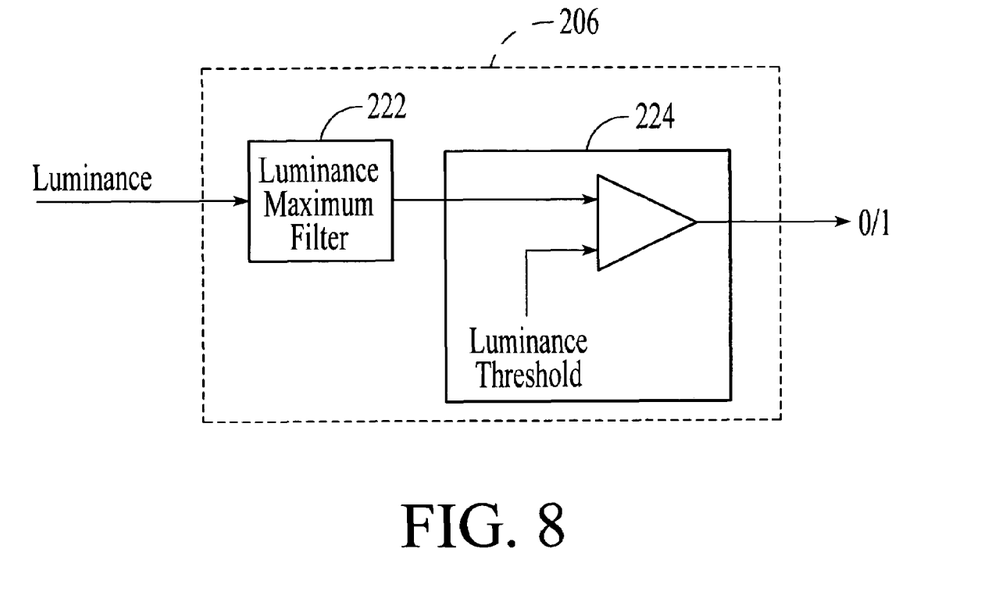
FIG. 8 is a block diagram of the components of a luminance detector included in the edge detection system in accordance with one embodiment of the invention.

As shown in FIGS. 2 and 8, the luminance detector 206 includes a luminance maximum filter 222 and a luminance analyzer 224. The luminance filter operates to extract the maximum luminance value from the current window of observation. The luminance analyzer operates to compare the maximum luminance value to a predefined luminance threshold. If the maximum luminance value is greater than the luminance threshold, the luminance analyzer outputs a "1", indicating that the maximum luminance condition has been satisfied. Otherwise, the luminance analyzer outputs a "0". The luminance threshold can be either fixed in advance, or can result from some adaptive background luminance tracking performed by a circuit (not shown) in parallel to the edge detection.

Figure 9:
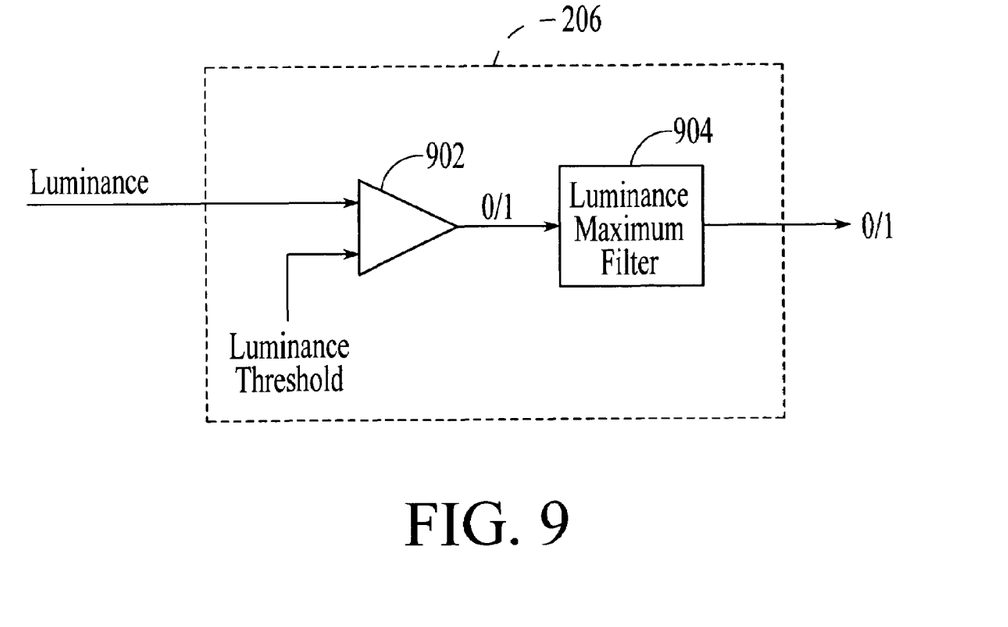
FIG. 9 is a block diagram of the components of the luminance detector in accordance with another embodiment of the invention.

In an alternative embodiment, the luminance detector 206 is configured such that the thesholding is performed prior to the maximum luminance filtering. In this embodiment, a comparator 902 is situated in front of a luminance maximum filter 904, as shown in FIG. 9. The comparator operates to generate a "1" for each luminance value within the current window of observation that exceeds the luminance threshold. For the luminance values that do not exceed the luminance threshold, the comparator generates 0's. The luminance maximum filter 904 operates to generate "1" as soon as a "1" is generated by the comparator 902. The advantage of this alternative embodiment is that by putting the comparator 902 at the front end, the complexity of the data to be transported through the pipeline is reduced. In addition, a less complex luminance maximum filter is needed for this embodiment.

For better rejection of the edges due to halftones, the luminance detector 206 may include a low-pass filter (not shown) at the front end. In this configuration, the isolated white pixels of halftones are pushed down to the global gray appearance of the halftones by the low-pass filter.

Turning back to FIG. 2, the color detector 208 of the edge detection system 102 operates to reject pixels in regions of color as text edge pixels. This is achieved by looking at the chrominance values of pixels within the current window of observation. The color detector operates in a manner similar to the luminance detector 206. However, the color detector is configured to generate a "0" if there is a pixel chrominance value within the current window of observation that is greater than a predefined chrominance threshold, and a "1" if there is no such pixel chrominance value.

Figure 10:
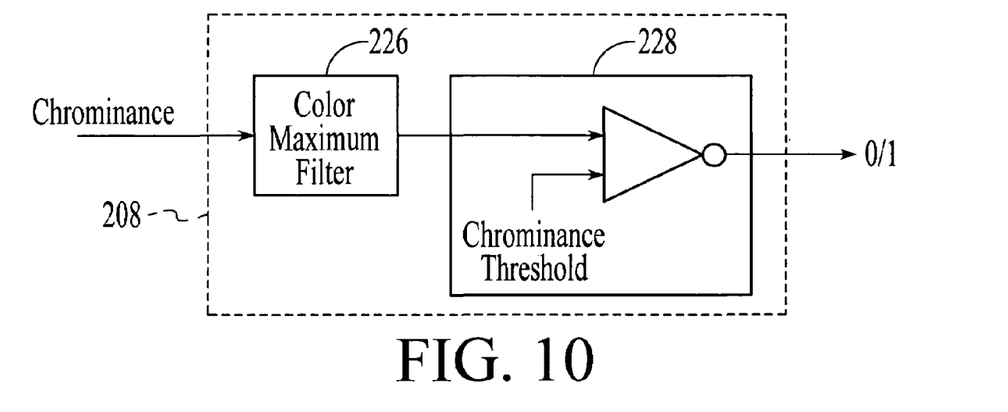
FIG. 10 is a block diagram of the components of a color detector included in the edge detection system in accordance with a first embodiment of the invention.

In one embodiment, the color detector 208 includes a color maximum filter 226 and a color analyzer 228 that are coupled in series, as shown in FIGS. 2 and 10. The color maximum filter operates to extract the maximum chrominance value from the current window of observation. The maximum chrominance value is then transmitted to the color analyzer, where it is compared to a chrominance threshold. The color analyzer outputs either a "1" or a "0" depending on whether the maximum chrominance value is greater than the threshold.

Figure 11:
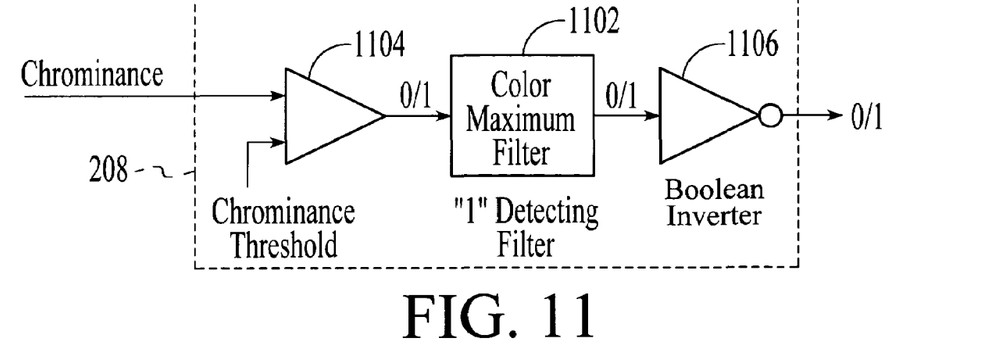
FIG. 11 is a block diagram of the components of the color detector in accordance with a second embodiment of the invention.

Similar to the luminance detector 206, the color detector 208 can alternatively be configured such that the thesholding is performed prior to the maximum chrominance filtering. In this alternative embodiment, the color detector includes a color maximum filter 1102 that is situated between a comparator 1104 and a boolean inverter 1106, as shown in FIG. 11. The comparator operates to generate a "1" for each chrominance value within the current window of observation that exceeds the chrominance threshold. For the chrominance values that do not exceed the chrominance threshold, the comparator generates 0's. The color maximum filter operates to generate "1" as soon as the comparator generates a "1". The output of the color maximum filter is then inverted by the inverter. This alternative embodiment provides a more efficient implementation than the previous embodiment.

In certain applications, it may be necessary to add some more features to the color detector 208. In particular, when the input image is a scanned document image, color fringes about the text edges may result from scanning misregistration. One technique to reduce these color fringes is to include a preprocessing low-pass filter (not shown). Another technique is to "wait" until the total number of 1's generated by the comparator 1104 for the current window of observation is above a predefined number threshold.

Figure 12:
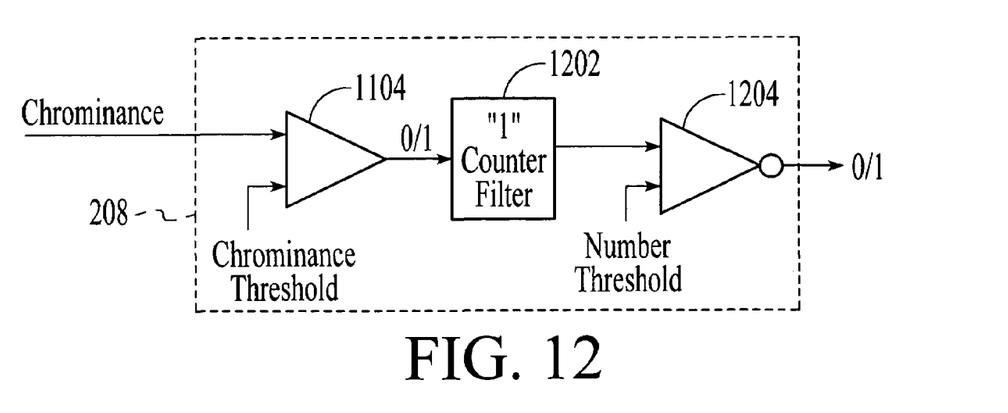
FIG. 12 is a block diagram of the components of the color detector in accordance with a third embodiment of the invention.

The color detector 208 that is designed to perform the latter technique is shown in FIG. 12. The color detector of FIG. 12 includes the comparator 1104, a "1" counter filter 1202, and a number comparator 1204. The counter filter is configured to keep track of the number of "1" outputs that are generated by the comparator 1104 for the current window of observation. The total number of 1's for the current window is then transmitted to the number comparator 1204, where the total number is compared to a predefined number threshold. If the total number exceeds the threshold, the number comparator outputs a "0". However, if the total number does not exceed the threshold, the number comparator outputs a "1".

Turning back to FIG. 2, the OR circuit 210 of the edge detection system 102 is coupled to the outputs of the gradient detector 202 and the curvature detector 204. The OR circuit is designed to output a "1" if at least one of the two detectors transmits a "1". The AND circuit 212 of the edge detection system is coupled to the outputs of the OR circuit, the luminance detector 206 and the color detector 208. Thus, the AND circuit must receive a "1" from each of these components to output a "1", indicating that the current pixel is an edge pixel. The detectors 202–208 are designed to process the luminance and chrominance values of the current window of observation in parallel. Thus, the edge detection system 102 is able detect text edges in an efficient manner.

In alternative embodiments, the edge detection system 102 may not include one or more of the detectors 202, 204, 206 and 208. For example, the system may include only the gradient detector 202 or only the curvature detector 204. Alternatively, the system may not include the luminance detector 206 and/or the color detector 208.

Figure 13:
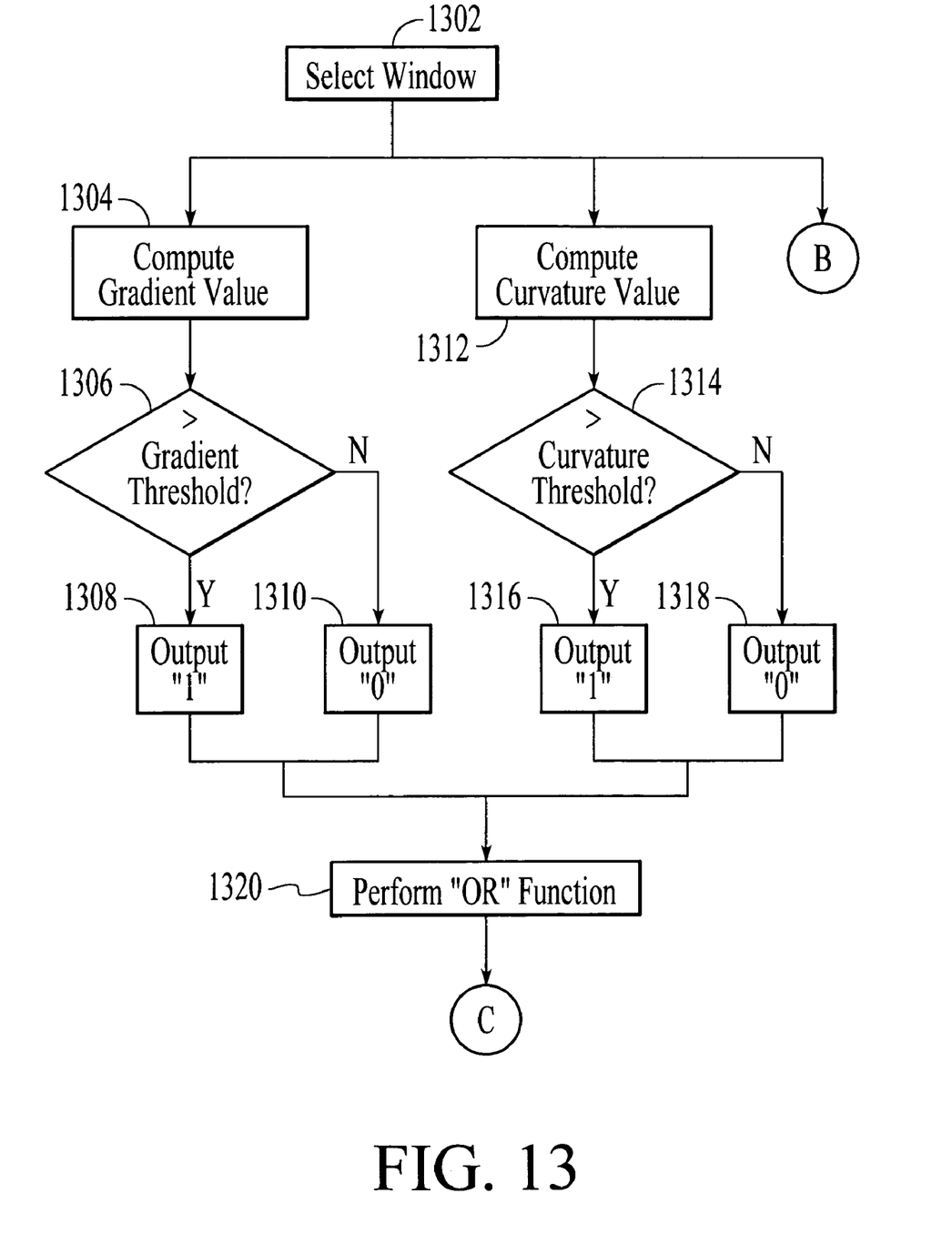
FIGS. 13 and 14 are process flow diagrams of a method of detecting text edges in accordance with the invention.
Figure 14:
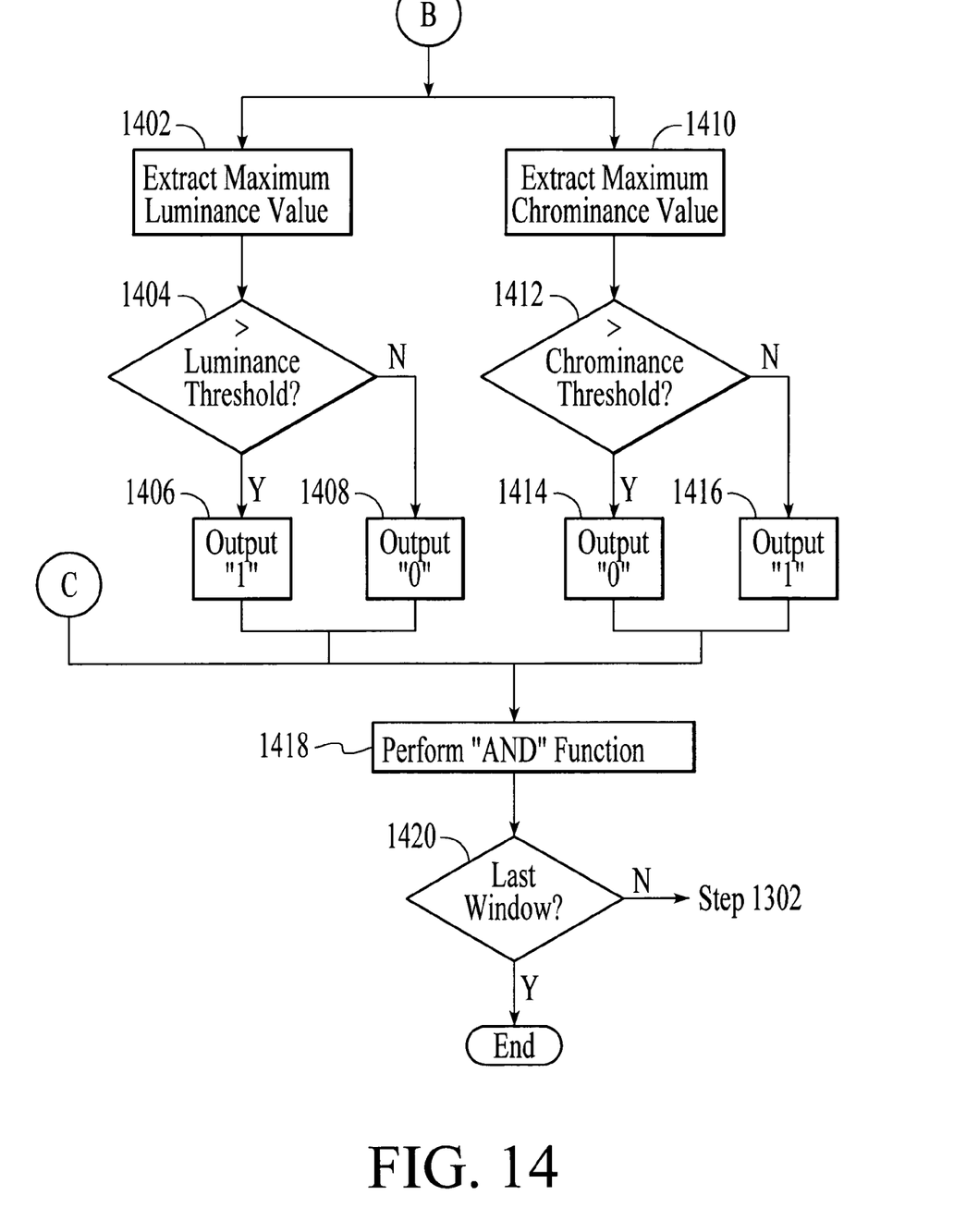

A method of detecting text edges in accordance with the invention is described with references to FIGS. 13 and 14. At step 1302, a window of observation is selected for a pixel of an input document image. As an example, the observation window may be a 5×5 pixel window. At step 1304, a gradient value for the luminance values of the pixels within the observation window is computed. The gradient value is computed by using vertical and horizontal gradient masks. The gradient value is then compared to a predefined gradient threshold, at step 1306. If the gradient value is greater than the gradient threshold, an output of "1" is generated, at step 1308. However, if the gradient value is not greater than the gradient threshold, an output of "0" is generated, at step 1310.

At step 1312, a curvature value for the luminance values of the pixels within the observation window is computed. The curvature value is computed by using vertical and horizontal curvature masks. The curvature value is then compared to a predefined curvature threshold, at step 1314. If the curvature value is greater than the curvature threshold, an output of "1" is generated, at step 1316. However, if the curvature value is not greater than the curvature threshold, an output of "0" is generated, at step 1318. Next, at step 1320, an "OR" function is performed on the output from step 1308 or 1310 and the output from step 1316 or 1318 to generate a "1" if at least one output of "1" is detected.

Turning now to FIG. 14, the maximum luminance value is extracted from the current observation window, at step 1402. Next, at step 1404, the maximum luminance value is compared to a predefined luminance threshold. If the maximum luminance value is greater than the luminance threshold, an output of "1" is generated, at step 1406. However, if the maximum luminance value is not greater than the luminance threshold, an output of "0" is generated, at step 1408.

At step 1410, the maximum chrominance value is extracted from the current observation window. Next, at step 1412, the maximum chrominance value is compared to a predefined chrominance threshold. If the maximum chrominance value is greater than the chrominance threshold, an output of "0" is generated, at step 1414. However, if the maximum chrominance value is not greater than the chrominance threshold, an output of "1" is generated, at step 1416.

In a preferred embodiment, steps 1304–1310, steps 1312–1318, steps 1402–1408 and steps 1410–1416 are performed in parallel.

Next, at step 1418, an "AND" function is performed on the output from step 1320, the output from step 1406 or 1408, and the output from step 1414 or 1416 to generate a "1" only when all of the outputs are 1's. At step 1420, a determination is made whether the current window of observation is the last window to be processed. If the current window is the last window, the method comes to an end. If the current window is not the last window, the method proceeds back to step 1302, and then steps 1302–1320 and steps 1402–1420 are repeated until the entire document image has been processed.

What is claimed is:

1. A method of detecting edges of features in digital images comprising:

computing a first luminance characteristic of a selected region of an input digital image, said first luminance characteristic corresponding to gradient of luminance values within said selected region;

computing a second luminance characteristic of said selected region of said input digital image, said second luminance characteristic corresponding to curvature of said luminance values within said selected region; and determining whether either one of said first and second luminance characteristics exceeds a predefined threshold, which is indicative of a presence of an edge of a feature in said selected region of said input digital image.

2. The method of claim 1 wherein said step of computing said first luminance characteristic includes computing a two-dimensional luminance gradient value for said selected region of said input digital image.

3. The method of claim 2 wherein said step of computing said two-dimensional luminance gradient value includes using a vertical gradient mask and a horizontal gradient mask to derive said two-dimensional luminance gradient value.

4. The method of claim 3 further comprising a step of applying a low-pass noise filter to said selected region of said input digital image.

5. The method of claim 4 wherein said step of applying said low-pass noise filter includes using a low-pass noise filtering mask as follows:

$$\begin{bmatrix} 1 & 2 & 1 \\ 2 & 4 & 2 \\ 1 & 2 & 1 \end{bmatrix}.$$

6. The method of claim 5 wherein said vertical gradient mask and said horizontal gradient mask incorporate said low-pass noise filtering mask, said vertical gradient mask and said horizontal gradient mask being respectively as follows:

$$\begin{bmatrix} -1 & -4 & -6 & -4 & -1 \\ -2 & -8 & -12 & -8 & -2 \\ 0 & 0 & 0 & 0 & 0 \\ 2 & 8 & 12 & 8 & 2 \\ 1 & 4 & 6 & 4 & 1 \end{bmatrix}$$

$$\begin{bmatrix} -1 & -2 & 0 & 2 & 1 \\ 4 & -8 & 0 & 8 & 4 \\ -6 & -12 & 0 & 12 & 6 \\ -4 & -8 & 0 & 8 & 4 \\ -1 & -2 & 0 & 2 & 1 \end{bmatrix}.$$

7. The method of claim 2 wherein said step of computing said second luminance characteristic includes computing a two-dimensional luminance curvature value for said selected region of said input digital image.

8. The method of claim 7 wherein said step of computing said two-dimensional luminance curvature value includes using a vertical curvature mask and a horizontal curvature mask to derive said two-dimensional luminance curvature value.

9. The method of claim 8 wherein said vertical curvature mask and said horizontal curvature mask incorporate a low-pass noise filtering mask of $$\begin{bmatrix} 1 & 2 & 1 \\ 2 & 4 & 2 \\ 1 & 2 & 1 \end{bmatrix},$$

said vertical curvature mask and said horizontal curvature mask being respectively as follows:

$$\begin{bmatrix} -1 & -4 & -6 & -4 & -1 \\ 0 & 0 & 0 & 0 & 0 \\ 2 & 8 & 12 & 8 & 2 \\ 0 & 0 & 0 & 0 & 0 \\ -1 & -4 & -6 & -4 & -1 \end{bmatrix}$$

$$\begin{bmatrix} -1 & 0 & 2 & 0 & -1 \\ -4 & 0 & 8 & 0 & -4 \\ -6 & 0 & 12 & 0 & -6 \\ -4 & 0 & 8 & 0 & -4 \\ -1 & 0 & 2 & 0 & -1 \end{bmatrix}.$$

10. The method of claim 1 further comprising a step of determining whether the maximum luminance value of said selected region of said input digital image exceeds a predefined luminance threshold.

11. The method of claim 1 further comprising a step of determining whether the maximum chrominance value of said selected region of said input digital image exceeds a predefined chrominance threshold.

12. The method of claim 1 further comprising a step of counting the number of chrominance values within said selected region of said input digital image that exceeds a predefined chrominance threshold.

13. A system for detecting edges of features in digital images comprising:

a first filter for computing a first luminance characteristic of a selected region of an input digital image, said first luminance characteristic corresponding to gradient of luminance values within said selected region;

a second filter for computing a second luminance characteristic of said selected region of said input digital image, said second luminance characteristic corresponding to curvature of said luminance values within said selected region; and means for determining whether either one of said first and second luminance characteristics exceeds a predefined threshold, which is indicative of a presence of an edge of a feature in said selected region of said input digital image.

14. The system of claim 13 wherein said first filter is configured to compute a two-dimensional luminance gradient value for said selected region of said input digital image.

15. The system of claim 14 wherein said second filter is configured to compute a two-dimensional luminance curvature value for said selected region of said input digital image.

16. The system of claim 13 further comprising a luminance detector operatively coupled to said first and second filters, said luminance detector being configured to determine whether the maximum luminance value of said selected region of said input digital image exceeds a predefined luminance threshold.

17. The system of claim 13 further comprising a color detector operatively coupled to said first and second filters, said color detector being configured to determine whether the maximum chrominance value of said selected region of said input digital image exceeds a predefined chrominance threshold.

\* \* \* \* \*